United States Patent [19]

Krismer et al.

[11] 4,446,116

[45] May 1, 1984

[54] PROCESS FOR RECOVERING NIOBIUM AND/OR TANTALUM COMPOUNDS FROM SUCH ORES FURTHER CONTAINING COMPLEXES OF URANIUM, THORIUM, TITANIUM AND/OR RARE EARTH METALS

[75] Inventors: Bruno Krismer; Axel Hoppe, both of Goslar, Fed. Rep. of Germany

[73] Assignees: Hermann C. Starck Bertin, Berlin; Uranerzbergbau-GmbH, Bonn, both of Fed. Rep. of Germany

[21] Appl. No.: 361,275

[22] Filed: Mar. 24, 1982

[30] Foreign Application Priority Data

Apr. 2, 1981 [DE] Fed. Rep. of Germany ....... 3113335

[51] Int. Cl.$^3$ ...................... C22B 34/24; C22B 60/02
[52] U.S. Cl. ........................ 423/63; 423/68; 423/65; 423/11; 423/18; 423/2
[58] Field of Search ...................... 423/11, 12, 17, 18, 423/20, 2, 62, 63, 65, 68

[56] References Cited

U.S. PATENT DOCUMENTS

| | | | |
|---|---|---|---|
| 2,537,316 | 1/1951 | Oppegaard et al. | 423/66 |
| 2,780,518 | 2/1957 | Gates et al. | 423/12 X |
| 2,873,165 | 2/1959 | Bailes et al. | 423/12 |
| 2,956,857 | 10/1960 | Ruhoff et al. | 423/20 |
| 3,341,304 | 9/1967 | Newby | 423/20 X |
| 3,640,679 | 2/1972 | Erhard et al. | 423/65 |
| 3,808,306 | 4/1974 | Smith et al. | 423/20 |
| 3,896,045 | 7/1975 | Peeters et al. | 423/12 X |
| 3,976,475 | 8/1976 | Markland | 423/63 X |
| 4,265,861 | 5/1981 | Cleary et al. | 423/11 X |
| 4,301,123 | 11/1981 | Gruet et al. | 423/20 |

FOREIGN PATENT DOCUMENTS 361685 8/1973 U.S.S.R. ................. 423/62

OTHER PUBLICATIONS

Merritt, Robert C., *The Extractive Metallurgy of Uranium*, Colorado School of Mines Research Institute, 1973, pp. 104–105, 303–306.

*Primary Examiner*—Benjamin R. Padgett
*Assistant Examiner*—Matthew A. Thexton
*Attorney, Agent, or Firm*—Ladas & Parry

[57] ABSTRACT

A process for recovering one or more nonradioactive transition metal compounds from an ore containing one or more compounds of said transition metal or metals and further containing at least one complex of a member selected from the group consisting of uranium, thorium, radium, titanium, and rare earth metals, which comprises decomposing said ore in crushed condition by means of an acid so that a portion of the ore is brought into solution in a liquid phase and another portion of the ore remains in a solid phase, said compound or compounds of the transition metal or metals to be recovered passing into only the liquid or into only the solid phase, the uranium in the crushed ore being treated so as to cause substantially all of said uranium to be present in an oxidation state in which it cannot, during the decomposition step, pass into the phase containing the transition metal compound or compounds.

5 Claims, No Drawings

PROCESS FOR RECOVERING NIOBIUM AND/OR TANTALUM COMPOUNDS FROM SUCH ORES FURTHER CONTAINING COMPLEXES OF URANIUM, THORIUM, TITANIUM AND/OR RARE EARTH METALS

The present invention relates to a process for recovering non-radioactive transition metal compounds from such ores containing compounds of said metals and further containing complexes of uranium, thorium, titanium, and/or rare earth metals.

The non-radioactive transition metals referred to herein are tantalum and niobium.

In the past tantalite, $(Fe,Mn)O.(Ta,Nb)_2O_5$, and microlite, $6\ CaO.3Ta_2O_5.NbOF_3$, were employed as the main ores for the recovery of tantalum compounds. Niobium and compounds thereof were mostly recovered from columbite, $(Fe,Mn)O.(Nb,Ta)_2O_5$, and pyrochlore, $(Ca,Ba, etc.)O.(Nb_2O_5)+(TiO_2,Ce_2O_3, etc.)$. With increasing consumption, especially of tantalum, it became more and more difficult to obtain these ores. Intensified recycling of scrap metal containing tantalum and the use of tantalum-containing tin slags and struverites, $(FeO.(Ta,Nb)_2O_5.4TiO_2)$, could close the supply gap for a longer period of time. So far, complex ores in which there are transition metals in addition to uranium and/or thorium and the rare earth metals, as in samarskites, $3(Fe,Ca,UO_2, etc.)O.(Ce,Y, etc.)_2O_3 \cdot 3(Nb,Ta)_2O_5$ euxenites and similar ores have hardly been utilized and then they have been used only for the recovery of rare earth metals and yttrium, which is also considered to belong to rare earth metals.

By means of a sulfuric acid treatment, it is possible to bring rare earth metals and throium into solution and separate them from the remaining accompanying substances (Chemical Engineering, 60, No. 1, 120 f (1953)). At the same time, there also dissolves a little titanium and small amounts of transition metals. The separation usually takes place by hydrolysis, whereby, due to an inclusion of solvent components into the glutinuous precipitate of the hydrolysis, it is impossible to avoid a contamination of the residues through radioactive substances which were present in the ore.

In the past, attempts were made to find ways to reuse the heretofore mentioned complex transition metal ores. For example, a chlorination process for reusing euxenite is described by A. W. Henderson et al (I.a.E. Chem. Vol. 50, No. 4, April 1958, page 611 f). The process allows a preseparation of the uranium, thorium and iron groups with the rare earth metals, titanium as an easily volatile chloride, and the transition metals according to the boiling points of the chlorides and oxychlorides of the elements in question. After the hydrolysis, the chlorides obtained can be reused in known hydro-metallurgical processes. Of course, considerable operational difficulties occur during the chlorination of ores due to corrosion, and the separation of chlorides through fractional distillation involves great expenditures for the equipment in comparison to the throughput of the plant.

A number of processes for reusing euxenite are known from patents and publications. These processes deal exclusively with the recovery of rare earth metals (U.S. Bureau of Mines, Rep. Invest. No. 5910 and 6577). These works do not provide any teaching for the recovery of non-radioactive transition metals from the aforementioned ores.

The Japanese Patent No. 6955 of Aug. 21, 1958, Skozo Iimori et al, describes in greater detail a process for the recovery of rare earth metals, transition metals, and uranium from samarskite and fergussonite $(Y,Er,Ce)_2O_3.(Nb,Ta)_2O_5$. According thereto one part by weight of the ore is treated with three parts by weight of 96 percent sulfuric acid and one part by weight of sodium sulfate at a temperature of from 300° to 350° C. for 1.5 hours and the solidified decomposed material is leached with 20 liters boiling water for 1 hour. In doing so, the yttrium oxides and uranium are brought into solution, while thorium and the cerite oxides remain in residue together with the transition metals. Said residue is treated with 9 liters of 10 percent sulfuric acid and 0.3 liter of 30 percent $H_2O_2$ for 1 hour to dissolve the transition metals at an elevated temperature. Upon separation of the dissolving residual matter, the transition metals are hydrolyzed by boiling for 1 hour and can thus be separated. The recovery of thorium and cerium from the filtrate of the transition metal hydrolysis with yttrium oxides may follow according to known methods; also, the filtrate from the water-leaching of the $Na_2SO_4$-$H_2SO_4$-decomposition product can be reused in the usual way for the recovery of yttrium oxides and uranium, for example, as $Na_2U_2O_7$. The ores of the samarskite groups always contain considerable amounts of $TiO_2$, which are also brought into soluble form during the $H_2SO_4$-$Na_2SO_4$ melting decomposition. A hydrolysis of titanium-sulfate begins while leaching the solidified melted material with water. Therewith the residue, which contains the transition metals, is contaminated, the solutions are less filterable, and follow-up precipitates appear when storing the solutions. If in accordance with the process the residue is dissolved with $H_2SO_4+H_2O_2$, there results pertitanate which, when boiling down $H_2O_2$, partly decomposes by separating out titanium oxide hydrate for the hydrolysis of the transition metals. In order to obtain the valuable substances of the ores employed in pure form, addition process steps are necessary. Besides, during the hydrolysis of the titanyl sulfate solutions, because of the disadvantageous form of the deposits, there are enclosed solvent components. This results in an uncontrollable deportation of radioactive components.

A process for decomposing complex ores with gaseous hydrogen fluoride is described in U.S. Pat. No. 2,816,815. The treatment with hydrofluoric acid is also mentioned there. Problems, which occur due to the presence of radioactive constituents in the initial ore are not mentioned.

The present invention is a modification of a process for recovering non-radioactive transition metal compounds from transition metal ores containing complexes of uranium, thorium, radium, titanium and rare earth metals by decomposing a crushed ore by means of an acid so that a portion of the ore is dissolved in a liquid phase and another portion remains in a solid phase. It is the object of the invention to modify this process so that it may be carried out efficiently by using ordinary equipment so that the transition metals, regardless of the uranium, thorium and radium content of the crude ore, are recovered in non-radioactive form.

The present invention provides that the crushed ore be subjected to a treatment whereby all of the uranium is present in an oxidation state in which it cannot be dissolved in the phase containing the transition metal compounds during the decomposition.

In this way it is possible to achieve a separation of the radioactive substances from the transition metal compounds which meets all practical requirements, whereby, if desired, the phase containing the radioactive substances may be further treated to recover valuable substances, preferably the uranium compounds. In general, this takes place by using an acid other than that in the case of the decomposition indicated above.

The present invention makes it possible in a first step to stir a finely crushed ore of <500 $\mu$m to a paste with—depending on the concentration—a 0.5 to 6-fold weight amount of 70 to 96 percent sulfuric acid and, by stirring or kneading, heat it to a temperature of from 200° to 350° C. During the decomposition phase, lasting from 0.5 to 3 hours, the sulfuric acid-ore-suspension must be oxidized with air to obtain those elements in the compounds which are of the highest valency. This process step is important to bring into solution such elements as, for example, uranium, together with the rare earth metals, titanium and thorium before substantial amounts of transition metals dissolve. Upon completion of the decomposition, the mixture is cooled and put in water. The resulting aqueous solution must contain between 30 g and 100 g of free sulfuric acid per liter of the dissolving leaching solution. Contained in the solution are the rare earth metals titanium, uranium, and thorium, but very little transition metals. Upon separation of the solution from the dissolving residual matter by decantation, filtration or centrifugation, the dissolving residual matter is re-washed with dilute sulfuric acid and the residue is transferred into a second decomposition vessel.

The separated solution contains more than 90 percent of the uranium and titanium, more than 95 percent of the rare earth metals, yttrium and thorium, but less than 5 percent of the transition metals, based on the amounts originally present in the ore.

In a second process step the residue of the first process step is treated with 70 percent hydrofluoric acid and concentrated sulfuric acid (96 percent) and, by stirring in closed decomposition vessels, heated to a temperature of from 80° to 120° C. The final concentration of the hydrofluoric acid must be between 8 and 30 normal and that of the sulfuric acid must be between 6 and 25 normal, whereby, in the case of a high hydrofluoric acid concentration, the sulfuric acid concentration must be low, and vice versa, in the case of a high sulfuric acid concentration, one can select a low hydrofluoric acid concentration. The decomposition period varies between 6 and 20 hours, depending on the temperature. The fluoro-complexes of the transition metals may be immediately extracted from the solution with methylisobutyl ketone or other suitable organic extraction agents, known from the literature, such as diethyl ketone, cyclohexanone, diisobutyl ketone, tributyl phosphate, diethylether, amylalcohol, methylethyl ketone, diisopropyl ether, and triisooctylamine. The aqueous, very acidic refined product is employed for further decomposition to reduce the hydrofluoric acid and sulfuric acid consumption. Niobium and tantalum are selectively re-extracted or precipitated from the organic phase by a stepwise reduction of the acid concentration, and the ketone is employed for further extractions. In that way more than 96 percent of tantalum and 95 percent of niobium of the amounts present in the ore are recovered in non-radioactive form. Residual leaches and washing water are subjected to a BaSO$_4$-collector precipitation to eliminate the last remains of radioactivity caused by traces of RaSO$_4$, and subsequently supplied to a waste water treatment. Measurements of the radioactivity of the nuclides U 238, Ra 226, Th 232 and Ra 228 with a multi-channel-$\gamma$-spectrometer did not yield any measurable radiation in the case of transition metal products.

In the related invention of Floeter et al., Ser. No. 427,244, filed Sept. 29, 1982, the crushed ore is first decomposed with hydrofluoric acid at an elevated temperature for more than three hours with substantially all the uranium, thorium, and radium compounds remaining in the residue, and substantially all the tantalum and niobium being dissolved as complexes with fluoride, and subsequently said hydrofluoric niobium-tantalum solution is further treated in an appropriate manner to recover niobium and tantalum. In the usual practice of said process, the finely crushed ore of <40 $\mu$m is treated with from 30 to 40 percent in excess of the stoichiometrically necessary amount of 70 percent hydrofluoric acid. Since the reaction is exothermic, not too much heat should be supplied at the beginning. The decomposition takes place at 80° C. under reflux of the escaping hydrofluoric acid. The decomposition lasts from 4 to 20 hours, depending on the type of ore employed. Thereupon niobium and tantalum is nearly quantitatively present in dissolved form.

Since, in general, uranium exists, at least in part in ores in its hexavalent form, it would, if no special precautionary measures are taken, also be brought into solution with niobium and tantalum. Since that should be prevented, U (VI) is reduced to U (IV) because in the latter form it cannot be dissolved by hydrofluoric acid. For that purpose a suitable reducing agent, preferably metallic iron dust in an amount of from 30 to 50 kilograms per ton of ore is added during the dissolution process. In this simple way it is possible, without any additional measures, for the uranium to remain as U (IV) in solid residue so that the solution is practically free from uranium and thorium. By doing so, uranium losses, which occur without the reducing treatment due to the formation of soluble uranyl fluorides, are avoided.

Upon completion of the decomposition, the reaction mixture is filtered off; the filter cake is washed with warm, dilute hydrofluoric acid. The filtrate, which has a hydrofluoric acid concentration between 10 and 20 normal, contains more than 97% of transition metals and less than 0.03 percent of uranium and thorium. The radium content depends on the type of ore and the reaction time, and lies between 7 ng/l and 21 ng/l. Due to a precipitation step, the residual amount of radium is practically entirely removed by adding Ba(NO$_3$)$_2$ and (NH$_4$)$_2$SO$_4$. Owing to a solvent extraction, as indicated above, the fluoro-complexes of tantalum and niobium can be extracted from the clarified solution. The residue contains more than 98 percent of the uranium and thorium, based on the amounts originally existent in the ore. Radium remains practically entirely residual so that the liquid phase, containing the transition metal compounds, is non-radioactive.

The residue may be decomposed in different ways to recover uranium.

There is a possibility of fully decomposing the residue by means of concentrated sulfuric acid in a double weight amount of the residue at a temperature of from 150° to 170° C. over 1 to 2 hours. The escaping hydrofluoric acid is condensed and returned to the process.

After digestion, the cooled decomposed mass is leached with water for one hour at 80° C. While leaching, oxidizing agents must be added to form anionic uranylsulfate complexes so that uranium is present as U(VI). The solution contains up to 99 percent of the uranium compounds. To recover uranium, the solution is further treated according to conventional methods.

In a further embodiment of the process, the solid residue is decomposed with 20 percent by weight of sulfuric acid at a boiling temperature (105° C.) by adding oxidizing agents. By adding powdered quartz, the emission of HF is eliminated due to the formation of $H_2(SiF_6)$. When using this decomposition method, the extraction rates lie at 90 percent of the uranium yield; thorium is dissolved by 1.5 percent. To recover uranium, the solution is further treated according to conventional methods.

There exists an additional possibility to effect a selective uranium dissolution by leaching the solid residue with sodium carbonate or a soda-alkaline 10 percent $K_2S_2O_8$ solution. The leaching periods being 48 hours and the temperature being 80° C., there is dissolved 92 percent of the uranium and only 0.1 percent of the thorium. Upon separation of the solution from the residue through filtration, uranium is deposited according to conventional methods.

Finally, it is also possible to leach the solid residue with a 10 percent aluminum nitrate solution by adding sodium chlorate as an oxidizing agent for leaching. In this way it is possible to obtain a solution with over 90 percent of the uranium. Thorium is dissolved by about 3 percent. After a solid-liquid separation, uranium may be selectively precipitated by means of special precipitating reagents.

EXAMPLE 1

(a) 1000 Grams of a crushed samarskite ore <150 μm (average particle size) of the composition:

$Nb_2O_5$: 19.13%
$Ta_2O_5$: 18.21%
$Y_2O_3$: 13.44%
$U_2O_8$: 4.0%
$ThO_2$: 2.42%
$TiO_2$: 12.4%
$WO_3$: 2.86%
MnO: 6.22%
CoO: 0.18%
FeO: 2.17%
$SnO_2$: 4.28%
$Al_2O_3$: 0.22%
$SiO_2$: 1.02%
$P_2O_5$: 2.03% were treated with 2000 grams of concentrated sulfuric acid (96 percent), heated to 250° C. by stirring and passing air therethrough, and maintained at said temperature for 1 hour. After cooling the solidified decomposed material, the solidified mass was coarsely crushed, put into 25 liters of 80° C. hot water, by stirring, and after finishing to add the solids, further stirring for 30 minutes. The solids precipitated, and the supernatant solution was decanted. The residue (I) was twice re-washed with dilute, about 1 normal, sulfuric acid. The obtained decantates were combined and they could be employed for the recovery of pure uranium, thorium and yttrium compounds, taking place in an appropriate manner, perhaps according to the process described by Ullmann, vol. 17, page 361, 1966.

(b) Residue (I) of the first process step, weighing 682 grams, was stirred to a paste with half a liter of water and, under stirring, put into a sealable fusion vessel, in which there were 1000 grams of hydrofluoric acid (70 percent) and 800 grams of sulfuric acid (96 percent). The reaction mixture was left for completion of the reaction at 100° C. for 8 hours. After the solution was cooled and the dissolving residual matter was allowed to settle, the supernatant, acid solution was separated by decanting. The residue was re-washed several times with an $HF/H_2SO_4$ solution of the above composition. The weight of the dissolving residual matter of the second process step was 168 grams. The hydrogen fluoride solutions of said second process step were combined and subjected to a multi-step counterflow extraction with methylisobutyl ketone to separate the transition metals from the residual impurities, according to the process indicated in the U.S. Report of Investigation No. 5862, 1961, Bureau of Mines. The separate re-extraction of the transition metals also took place as indicated therein. The analytical products of pure niobium oxide amounted to 182.1 grams, of pure tantalum oxide to 175.7 grams, the corresponding yields were about 95.2% for $Nb_2O_5$ and 96.7% for $Ta_2O_5$. These yield data relate to the transition metal content of the samarskite ore.

Both the refined product of the acid decomposition phase and the wash solutions, resulting when re-extraction and transition metal precipitation is in progress, were purified by a barium-sulfate-collector precipitation aimed at totally eliminating the traces of radioactive radium so that a contamination of the wash treatment steps with residual radiation was avoided.

EXAMPLE 2

(a) 300 Grams of a crushed fergusonite ore concentrate, particle size <40 μm, of the composition:

$Nb_2O_5$: 19.54 weight %
$Ta_2O_5$: 21.3 weight %
$Y_2O_3$: 19.19 weight %
$U_3O_8$: 3.11 weight %
$ThO_2$: 3.27 weight %
$TiO_2$: 1.47 weight %
$WO_3$: 1.0 weight %
$ZrO_2$: 0.18 weight %
$Al_2O_3$: 1.4 weight %
Ra 226: 8.7 ng/g
MoO: 0.14%
CaO: <0.002%
FeO: 1.06%
$Fe_2O_3$: 7.80%
$Sb_2O_3$: <0.05%
CaO: 0.74%
$P_2O_5$: 1.63%
$Bi_2O_3$: <0.01%
$SnO_2$: 0.09% were mixed with 500 grams of hydrofluoric acid (70 percent) and stirred for 16 hours under nitrogen atmospheric pressure as well as by adding of from 30 to 60 kilograms of iron dust per tone of ore. The leaching temperature was 80° C. Upon completion of the leaching process, the still warm slurry was filtered and the residue was three times washed with warm 40 percent hydrofluoric acid. The solution, with acidity to about 20 N, contained <0.001 g/l $U_3O_8$, <0.002 $ThO_2$, 4.0 g/l $Ta_2O_5$, 82 g/l $Nb_2O_5$, and 9.1 ng Ra 226/l.

Thus, based on the crude ore content, there were dissolved 98% of the tantalum and 92% of the niobium, while less than 0.03% of the uranium was extracted.

To remove the residual concentration of Ra 226 by means of a collector-precipitation, the solution was treated with 0.5 g Ba(NO$_3$)$_2$/l by adding (NH$_4$)$_2$SO$_4$ up to a concentration of 0.1 N in a precipitation step.

After the collector-precipitation, the solution contained only about 2 ng Ra/l.

The thus obtained solution was free from radioactive components in the sense of the radiation protection regulation and could be employed for the recovery of pure tantalum and niobium compounds according to conventional methods.

(b) Out of the 174.4 g heavy residue of the first process step, containing among other things 5.20% U$_3$O$_8$, 4.90% ThO$_2$, 0.28% Ta$_2$O$_5$, 1.3% Nb$_2$O$_5$ as well as about 13 ng Ra 226/g, 40 grams were stirred to a paste with concentrated sulfuric acid in a ratio of residue to acid of 1:2. The mixture was decomposed under stirring at 170° C. for 3 hours. After cooling, the cooled decomposition mass was diluted with water, oxidized and leached for half an hour at 80° C. After the solution was filtered off and the residue was three times washed with warm, dilute sulfuric acid, the solutions of said second process step were combined. Based on the amounts present in the residue, the solution contained more than 99% of uranium and thorium.

The weight of the residual matter of the second process step was 4.2 grams. After a pH adjustment, uranium was isolated from the separated solution in a multi-step solvent-extraction by tertiary amine, according to known processes.

Further possible variants may be added to the above described Examples:

Thus, for example, the decomposition according to the first process step was carried out so that the finely crushed samarskite ore was pelletized with a 0.7-fold amount of concentrated sulfuric acid prior to the (thermal) decomposition, and the required oxidation was carried out by roasting said pellets in a rotary tubular kiln at 350° C. Said roasting of the decomposition mass in the rotary tubular kiln was, among other things, also carried out by supplying air enriched with oxygen, however, this additional expenditure did not bring any improved decomposition degree over normal air.

These variants should not, however, restrict the possibilities for carrying out the process according to the invention, but should make it clear that temperatures and equipment for performing the invention should be adapted according to the concentration of the sulfuric acid used and the consistency of the decomposition mixtures.

Measurements of Radiation Intensities

The radioactivity of the solids and solutions obtained in the individual process steps was determined with a multi-channel-γ-spectrometer, model S 80 of the firm Canberra, the type of the detector-crystal "Closed End Coaxial Model 7229, Efficiency 25.5%" of the firm Canberra consisting of Li-doped germanium. The following Table shows, how, proceeding from samarskite ores, the nuclides U 238, Ra 226, Th 232, and Ra 228 are distributed over individual process steps:

| Nuclide | Samarskite 1 kg | Decomposition solution Step I | Residue Step I 682 g | Ta, Nb oxide 357.8 g | Residue Step II 168 g | Residual leaching solution |
|---|---|---|---|---|---|---|
| U 238  | 11.2 μCi | 10.1 μCi | 1.06 μCi | <0.01 μCi | 1   μCi | 0.05 |
| Ra 226 | 10.5 μCi | 0.15 μCi | 10.3 μCi | <0.01 μCi | 10.2 μCi | <0.01 |
| Th 232 | 2.17 μCi | 2.05 μCi | 0.11 μCi | <0.01 μCi | 0.1 μCi | <0.01 |
| Ra 228 | 2.14 μCi | 0.07 μCi | 2.03 μCi | <0.01 μCi | 2   μCi | <0.01 |

In the scope of accuracy of measurement of the α-spectrometer, no radioactivity could be determined for the Ta and Nb oxide.

In the first process step 90.3% of U$_3$O$_8$ and 95.1% of ThO$_3$ were dissolved from the samarskite ore. By applying a hydrofluoric acid/sulfuric acid leaching, those portions of said elements which remained in residue I were not dissolved into noteworthy fractions and thus got into the residue of the second process step. Based on the analytical product of said residue, the U$_3$O$_8$ content is about 2.3% and the ThO$_2$ content is about 0.7%. Consequently, said residue can be employed for renewed recovery of uranium according to known methods.

SUMMARY

A process for recovering non-radioactive transition metal compounds from transition metal ores containing complex uranium, thorium, radium, titanium and rare earth metals.

In a process for recovering non-radioactive transition metal compounds from transition metal ores containing complex and other uranium, thorium and radium, the crushed ore is first subjected to a treatment according to which the substantially all the uranium is present in an oxidation state in which, during the decomposition, it cannot go into the phase containing the transition metal compounds. Moreover, the ore can be decomposed with sulfuric acid; by doing so, uranium and thorium are brought into solution and the transition metal compounds remain in solid residue. According to other possibilities, the ore is decomposed by means of hydrofluoric acid, a reduction of the uranium to U$^{IV}$ taking tplace at the same time, so that niobium and tantalum are brought into solution, uranium and thorium, however, remain in the solid residue. In the first case the solid residue is further treated with hydrofluoric acid to recover Ta and Nb; in the second case, if desired, the solid residue is further treated with sulfuric acid to recover uranium.

We claim:

1. A process for recovering tantalum and/or niobium metal compounds from an ore containing one or more compounds of said metal or metals and further containing uranium, thorium, radium, titanium, and rare earth metals, wherein in a first step (I) the crushed ore is decomposed with a 0.5 to 6-fold amount of 70 to 96 percent sulfuric acid at elevated temperatures in the range of 200° to 350° C. for 0.5 to 3 hours with air as the oxidation agent, whereby the elements uranium, thorium and titanium are brought into solution by being converted to water soluble sulfates, the resulting solution being a solution of sulfuric acid comprising 30 to 100 grams $H_2SO_4$ per liter, while substantially all the transition metals remain together with radium in a water-insoluble residue, the residue then being decomposed within 6 to 20 hours in a second step (II) by leaching the residue of the first step (I) with a mixture of sulfuric acid and hydrofluoric acid at a temperature in the range of from 80° to 120° C., whereby there results a solution of transition metals wherein HF is between 8 and 30 normal and sulfuric acid is between 25 and 26 normal, and from which, by means of appropriate organic extraction agents, the transition metals are extracted as fluoro-complexes by liquid-liquid extraction, and the individual transition metals are recovered free from radioactive constituents as pure compounds in yields of more than 95 percent of the charge, while the refined products of the liquid-liquid extraction and wash water are further processed to eliminate the last traces of $RaSO_4$.

2. A process according to claim 1, wherein, in the second step (II), methyl isobutyl ketone is used as an extraction agent.

3. A process according to claim 1 or 2, wherein the crushed ore is decomposed according to the first step (I) with a 1.5 to 4 fold amount of an 80 to 96 percent by weight sulfuric acid at a temperature of 220° to 270° C. for 1 to 1.5 hours.

4. A process according to claim 1, in which a tantalum compound is recovered.

5. A process according to claim 1, in which a niobium compound is recovered.

* * * * *

UNITED STATES PATENT AND TRADEMARK OFFICE
CERTIFICATE OF CORRECTION

PATENT NO. : 4,446,116

DATED : May 1, 1984

INVENTOR(S) : BRUNO KRISMER: AXEL HOPPE

It is certified that error appears in the above—identified patent and that said Letters Patent is hereby corrected as shown below:

On the title page;

Cover page, under "[73] Assignees:" substitute

"Berlin" for "Bertin"

Signed and Sealed this

Sixteenth Day of July 1985

[SEAL]

Attest:

DONALD J. QUIGG

Attesting Officer     Acting Commissioner of Patents and Trademarks